UNITED STATES PATENT OFFICE.

HERMANN BERKEFELD, OF VIENNA, ASSIGNOR TO A. G. PUMMERER, OF WELS, AUSTRIA-HUNGARY.

INSECTICIDE.

SPECIFICATION forming part of Letters Patent No. 469,892, dated March 1, 1892.

Application filed September 15, 1891. Serial No. 405,778. (No specimens.) Patented in Austria-Hungary June 20, 1890, No. 9,716 and No. 22,296.

*To all whom it may concern:*

Be it known that I, HERMANN BERKEFELD, a subject of the Emperor of Austria-Hungary, and a resident of Vienna, in the Empire of Austria-Hungary, have invented certain new and useful Improvements in Insecticides, (for which I have obtained a patent in Austria-Hungary June 20, 1890, No. 9,716 and No. 22,296,) of which the following is a specification.

The present invention relates to a new fluid insecticide to be used more especially in destroying parasites injurious to plants, vines, and woods—viz., particularly the *Phylloxera vastatrix* and the *Dispar monacha*. It may also be used for destroying the *Peronospora*.

The preparation of the fluid is effected as follows: The fruit of the horse-chestnut (*Æsculus*) is crushed to the form of a paste and is diluted with several volumes of water. After some time when the water has dissolved the soluble matter of the horse-chestnut the solution will constitute one of the ingredients of the insecticide. The second ingredient is formed of resin so dissolved in a solution of carbonate of soda that it can be diluted with water. A suitable proportion is three pounds of resin to one pound of crystallized carbonate of soda and about one pint of water, although this proportion may be varied according to the quality of the resin and the amount of water contained in the soda. The first ingredient (extract of horse-chestnuts) is now mixed with more or less of the second ingredient, (solution of resin,) according to the amount of adhesiveness the mixture may be desired to have, and this mixture constitutes the fluid insecticide and can be used for killing parasites injurious to plants—such as the *Dispar monacha*, the *Phylloxera*, the *Peronospora*, &c.—as well as other insects, the action of the insecticide taking place without injuring in any way the health of the plants.

In using the insecticide it may be diluted with water more or less, according to the character of the insect to be killed.

I claim—

A fluid insecticide consisting of an extract of horse-chestnuts and a solution of resin, substantially as described.

In testimony whereof I have affixed my signature in presence of two witnesses.

HERMANN BERKEFELD.

Witnesses:
C. O. PAGET,
P. G. HARDY.